United States Patent
Arbogast

(10) Patent No.: US 10,423,148 B2
(45) Date of Patent: Sep. 24, 2019

(54) REDUNDANT AUTOMATION SYSTEM AND METHOD FOR OPERATION THEREOF

(71) Applicant: Siemens Aktiengesellschaft, Munich (DE)

(72) Inventor: Hans-Jürgen Arbogast, Ursensollen (DE)

(73) Assignee: Siemens Aktiengesellschaft, Munich (DE)

(*) Notice: Subject to any disclaimer, the term of this patent is extended or adjusted under 35 U.S.C. 154(b) by 257 days.

(21) Appl. No.: 14/949,627

(22) Filed: Nov. 23, 2015

(65) Prior Publication Data
US 2016/0154403 A1 Jun. 2, 2016

(30) Foreign Application Priority Data

Nov. 28, 2014 (EP) .................................... 14195312

(51) Int. Cl.
| | |
|---|---|
| *G05B 19/408* | (2006.01) |
| *G05B 19/042* | (2006.01) |
| *G05B 19/414* | (2006.01) |
| *G05B 19/05* | (2006.01) |

(52) U.S. Cl.
CPC ....... *G05B 19/408* (2013.01); *G05B 19/0428* (2013.01); *G05B 19/414* (2013.01); *G05B 2219/33315* (2013.01)

(58) Field of Classification Search
CPC .......................... G05B 19/408; G05B 19/0428; G05B 19/414; G05B 2219/33315
See application file for complete search history.

(56) References Cited

U.S. PATENT DOCUMENTS

| | | | |
|---|---|---|---|
| 5,148,433 A | 9/1992 | Johnson et al. | |
| 6,640,314 B1* | 10/2003 | Lelaure ................ | G05B 19/058 714/10 |
| 2002/0083364 A1* | 6/2002 | Christensen ........ | G06F 11/2005 714/13 |
| 2005/0232145 A1* | 10/2005 | Tanju ....................... | G05B 9/03 370/217 |
| 2008/0107160 A1* | 5/2008 | Karaki ................ | H04L 25/4906 375/220 |
| 2009/0076628 A1* | 3/2009 | Smith ................ | G05B 19/4184 700/3 |
| 2012/0246341 A1* | 9/2012 | Merk .................. | H04L 67/1065 709/245 |

(Continued)

FOREIGN PATENT DOCUMENTS

DE    102009050449 B3    12/2010

*Primary Examiner* — Brian W Wathen
*Assistant Examiner* — Brian T McMenemy
(74) *Attorney, Agent, or Firm* — Cozen O'Connor

(57) ABSTRACT

Redundant automation system and method for the operation thereof in which a reference device is used to provide simplified addressing of a main automation device and a substitute automation device in the redundant automation system for controlling a technical apparatus, where the reference device is configured to activate a first connection path between further automation components, which are connected to the field bus, and the first automation device, and is furthermore configured to recognize a failure of the first automation device and thereupon to activate a second connection path between the further automation components, which are connected to the field bus, and the second automation device.

9 Claims, 3 Drawing Sheets

(56) References Cited

U.S. PATENT DOCUMENTS

| | | | |
|---|---|---|---|
| 2013/0007319 A1* | 1/2013 | Decker | G06F 11/2005 |
| | | | 710/110 |
| 2015/0095690 A1* | 4/2015 | Grosch | G05B 19/058 |
| | | | 714/4.11 |
| 2015/0256431 A1* | 9/2015 | Buchanan | H04L 67/22 |
| | | | 709/224 |
| 2016/0112406 A1* | 4/2016 | Bugrov | H04L 63/0823 |
| | | | 726/10 |
| 2016/0202684 A1* | 7/2016 | Pauchet | G05B 19/0428 |
| | | | 700/28 |

* cited by examiner

REDUNDANT AUTOMATION SYSTEM AND METHOD FOR OPERATION THEREOF

BACKGROUND OF THE INVENTION

1. Field of the Invention

The invention relates to a redundant automation system for controlling a technical apparatus, comprising a first automation device and a second automation device, where the first automation device has a first control program and the second automation device has a second control program for controlling the technical apparatus, where the first and the second control programs are each configured to execute the same control tasks for the technical process, where the first automation device has a first data interface that is connected to a field bus, and the second automation device has a second data interface that is connected to the field bus, and where a first address is assigned to the first data interface and a second address is assigned to the second data interface.

2. Description of the Related Art

A redundant automation system is also referred to as a high-availability system ((HA) system). One such HA system is a fail-safe automation system, usually comprising two linked automation devices, in particular programmable logic controllers, which jointly control a technical apparatus. Here, one automation device takes the lead at all times when controlling the technical apparatus. The leading automation device in each case is also referred to as the main automation device or master. The other automation device in each case is ready to assume responsibility for the control of the technical apparatus at any time. The other automation device is also referred to as the substitute automation device or reserve. If one of the two automation devices fails, then the entire technical process can be controlled by a single automation device, this being referred to as high availability. In a HA system, each automation device has a dedicated interface, e.g., an Ethernet interface, with a dedicated IP address for communication on a field bus.

An automation installation usually includes many subscribers, who must connect to the redundant automation system to deliver or collect process data, or to display or process the data. A large number of the aforementioned subscribers have no knowledge of the existence of a redundant automation system (2-CPU system).

Conventional HA systems have the disadvantage that the remote IP address of the HA system is not clear to subscribers who have to establish a connection to an HA system. It either has a first address for the first automation device or a second address for the second automation device. If one of the two addresses is used, and precisely that automation device having the chosen address fails, the subscriber is no longer able to establish the connection even though the HA system as a whole is still available.

This problem was previously solved by the existence of functionally enhanced subscribers (clients, HMIs) in which a further IP address is configured. If the connection to the first address fails and cannot be re-established, a second IP address is used to continue working. The disadvantage of this solution is that a special implementation for the address management is required in the subscribers.

SUMMARY OF THE INVENTION

It is an object of the present invention to provide a redundant automation system for controlling a technical process that provides the ability to dispense with a special implementation in subscribers.

This and other objects and advantages are achieved in accordance with the invention in a redundant automation system by virtue of a reference device having a reference data interface that is connected to a field bus and to which a reference address is assigned, where the reference device is configured to activate a first connection path between further automation components, these being connected to the field bus, and the first automation device, and is furthermore so embodied as to recognize a failure of the first automation device and thereupon to activate a second connection path between the further automation components, these being connected to the field bus, and the second automation device. By virtue of the redundant automation system in accordance with the invention, it is now no longer necessary to implement a mechanism, for the purpose of address switching following a connection failure, in a subscriber or in the further automation components connected to the field bus and wanting to communicate with the redundant automation system. It is now possible to allow any number of subscribers who have absolutely no knowledge that they are communicating with an HA system.

In an advantageous embodiment, a connection setup by the further automation components to the first automation device or the second automation device is established via the further automation components contacting the reference address of the reference device. A logical connection to a plurality of devices is solved by adding an indirection. All subscribers, including subscribers who have no knowledge of an HA system, can contact the HA system using the fixed reference address. A failure of a CPU or automation device, or a "master role-swap", remains all but hidden from the subscribers.

In particular, when using the previously described reference device to upgrade a redundant automation system, the reference device is advantageously formed as a separate device and connected to the field bus separately from the first automation device and the second automation device. This means that, for example, existing redundant automation system installations can therefore be upgraded by simply connecting the reference device to any desired point on the field bus, such that the further subscribers connected to the field bus no longer need to have knowledge of two addresses that can be contacted.

For purposes of improved diagnostics, it has proved to be advantageous if the reference device advantageously has a monitoring device which is configured to monitor established connections of the further automation components to the first automation device with respect to a connection termination.

In a particularly optimized embodiment of the redundant automation system, the reference device has an initialization device, which is configured to inform the first automation device and/or the second automation device of the existence on the field bus of the reference device when the reference device is first connected to the field bus, where the automation devices upon learning of the existence of the reference device are furthermore configured to notify the reference device which of the two automation devices currently controls the technical apparatus. The first automation device or the main automation device or the master notifies the reference device of this characteristic accordingly. Any subscriber can therefore establish a connection to the reference device, which forwards the data stream (connection) to the automation device that is currently configured as master.

The objects of the invention are also achieved by a method for operating a redundant automation device for controlling a technical apparatus, where a first automation device is operated as a main automation device and a second automation device is operated as a substitute automation device, where the first automation device is synchronized with the second automation device via a link, where a first control program is operated in the first automation device and a second control program is operated in the second automation device for the purpose of controlling the technical apparatus, where the first and the second control programs in functional terms each execute the same control tasks for the technical apparatus, where the first automation device is operated on a field bus via a first data interface and the second automation device is operated on the field bus via a second data interface, and where the first data interface is assigned a first address and the second data interface a second address. In accordance with the method of the invention, a reference device having a reference address is operated so as to activate a first connection path between further automation components, these being connected to the field bus, and the first automation device, and is furthermore operated so as to recognize a failure of the first automation device and thereupon to activate a second connection path between the further automation components, these being connected to the field bus, and the second automation device. In the event of a failure of the main automation device of the redundant automation system or the HA system, the connection must be terminated and the subscriber must re-establish the connection. The termination of the connection is usually caused by an adverse status of a session in the connection. The reference device now ensures that the new connection setup is directed to the substitute automation device.

A connection setup by the further automation components to the first automation device or the second automation device is advantageously effected via the further automation components contacting the reference address.

The reference device may be formed as a separate device and therefore operated as a separate device and advantageously operated separately from the first automation device and the second automation device on the field bus.

For greater ease of diagnosis, provision is advantageously made for a monitoring device that operates in the reference device and monitors established connections of the further automation components to the first automation device with respect to a connection termination.

In particular, if the reference device is connected to any desired point on the field bus, provision is advantageously made for an initialization device that operates in the reference device, detecting the initial connection of the reference device to the field bus and informing the first automation device and/or the second automation device of its existence on the field bus, where the automation devices having been informed of the existence of the reference device are furthermore operated so as to notify the reference device which of the two automation devices currently controls the technical apparatus.

In a further embodiment of the information notification relating to the existence of the reference device on the field bus, the initialization device initiates a first notification call to the first automation device and a second notification call to the second automation device, where the first notification call is acknowledged by the first automation device via a first reply and the second notification call is acknowledged by the second automation device via a second reply. In the event that the first reply reveals that the first automation device is the main automation device, the reference device is configured such that connection requests directed to the reference address from the further automation components connected to the field bus are routed via the first address to the first automation device, and in the event that the second reply reveals that the second automation device is the main automation device, the reference device is configured such that connection requests directed to the reference address from the further automation components connected to the field bus are routed via the second address to the second automation device.

Within the scope of the invention, something is redundant if it is present more than once in an identical or a very similar form. High availability is usually achieved, in the context of a system component failure, by virtue of an equivalent component that is provided for this eventuality assuming the task of the failed component. High availability levels are achieved because the probability that two components of the same kind will fail at the same time is low.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of a redundant automation device and a reference means, in which.

DETAILED DESCRIPTION OF THE EXEMPLARY EMBODIMENTS

Figure 1:
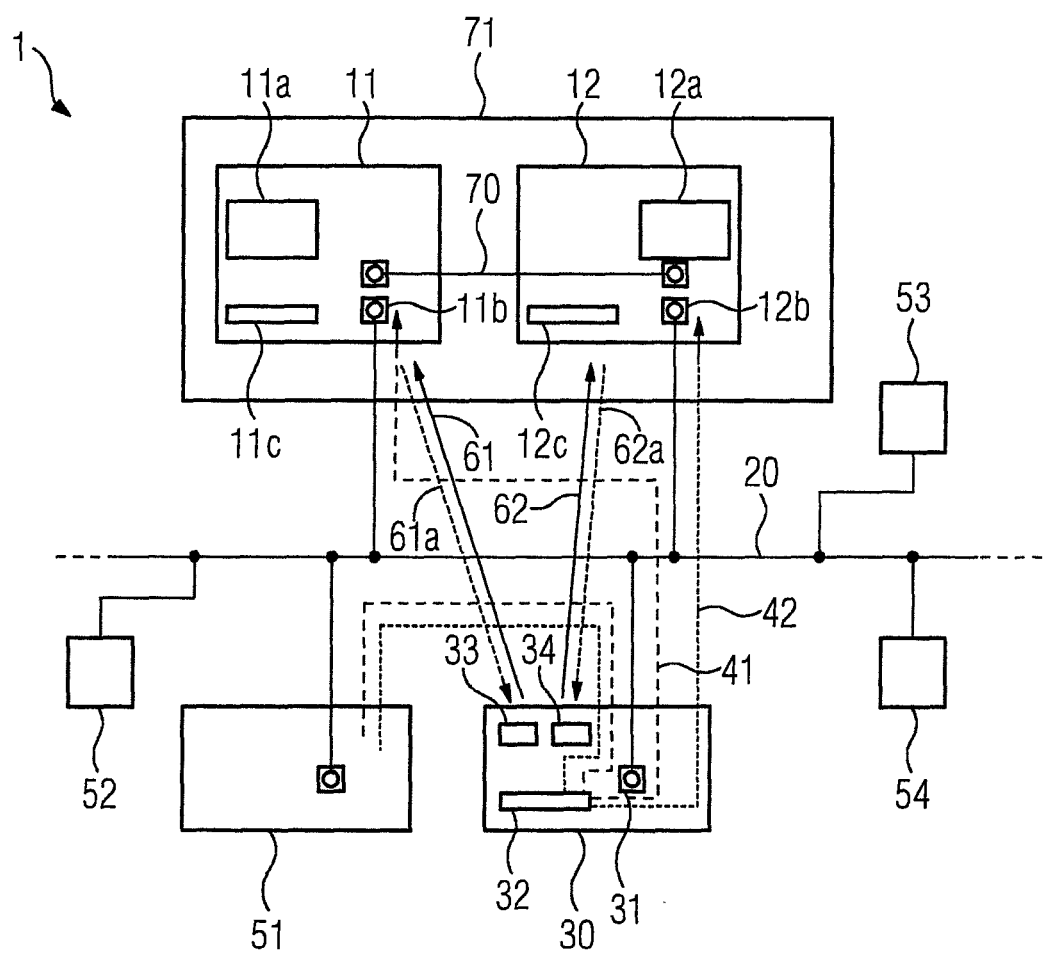
FIG. 1 shows a schematic illustration of a redundant automation device for controlling a technical apparatus in accordance with the invention.

FIG. 1 shows a redundant automation system 1 for controlling a technical apparatus or a technical process. An HA system 71 is produced by combining a first automation device 11 and a second automation device 12, where components are connected together via a link 70 for the purpose of synchronization. The first automation device 11, which is configured as a main automation device or master, and the second automation device 12, which is configured as a substitute automation device or reserve, are used for the purpose of controlling safety-critical processes in particular, e.g., in the field of petrochemicals.

The first automation device 11 has a first control program 11a and the second automation device 12 has a second control program 12a for controlling the technical apparatus. The first and the second control programs 11a,12a are so embodied that they can each execute the same control tasks for the technical apparatus.

In order to allow communication with further automation components 51,52,53,54 connected to a field bus 20, the first automation device 11 has a first data interface 12b. The second automation device 12 likewise has a second data interface 11b for the communication via the field bus 20. The first data interface 11b and the second data interface 12b are connected to the field bus 20, where the first data interface 11b is assigned a first address 11c and the second data interface 12b a second address 12c for establishing communication from the connected automation components 51,52, 53,54 to the first automation device 11 or the second automation device 12, respectively.

If it is assumed that, for example, a first automation component 51 initially always communicates with the first automation device 11 when controlling the technical apparatus, and that in the course of time the first automation device 11 fails, the connection from the first automation component 51 to the first automation device 11 would terminate.

Prior to the solution in accordance with the invention, the first automation component 51 would not have any knowledge of the second address 12c of the second automation device 12 unless the special implementation cited in the introduction was present in the first automation component 51. By virtue of a reference device 30 comprising a reference data interface 31 that is connected to the field bus 20 and to which a reference address 32 is assigned, in the event of a failure of the first automation device 11, a connection that is terminated by the first automation device 11 can now be automatically established to the second automation device 12. The reference device 30 is configured to activate a first connection path 41 between automation components 51,52,53,54, these being connected to the field bus 20, and the first automation device 11, and is furthermore configured to recognize the failure of the first automation device 11 and thereupon to activate a second connection path 42 between the further automation components 51,52,53,54, these being connected to the field bus 20, and the second automation device 12.

The redundant automation system 1 is constructed such that a connection setup is always directed to one of the two automation devices 11,12, irrespective of the originating further automation component, e.g., the first automation component 51, a second automation component 52, a third automation component 53 or a fourth automation component 54, all of these being connected to the field bus 20. A connection setup by the further automation components 51,52,53,54 to the first automation device 11 or to the second automation device 12 is therefore always effected by contacting the reference address 32.

The reference device 30 is formed as a separate independent device, and is connected to the field bus 20 separately from the first automation device 11 and the second automation device 12.

For the purpose of improved diagnosis, the reference device 30 has a monitoring device 33 that is configured to monitor established connections of the further automation components 51,52,53,54 to the first automation device 11 with respect to a connection termination.

Allowing for the possibility that the reference device 30 is formed as a separate independent device and may be connected anywhere on the field bus 20, the reference device 30 has an initialization device 34 that is configured to inform the first automation device 11 and/or the second automation device 12 of the existence of the reference device 30 on the field bus 20 when the reference device 30 with its reference data interface 31 is first connected to the field bus 20, where the automation devices 11,12 upon learning of the existence of the reference device 30 are furthermore configured to notify the reference device 30 which of the two automation devices 11,12 currently controls the technical apparatus and has assumed the role of the main automation device or master.

The continuous and broken arrows between the reference device 30 and the first automation device 11 and the second automation device 12 show that a first notification call 61 is initiated from the reference device 30 to the first automation device 11 and a second notification call 62 is initiated from the reference device 30 to the second automation device 12. The first automation device 11 responds to the first notification call 61 with a first reply 61a and the second automation device 12 responds to the second notification call 62 with a second reply 62a. The first reply 61a or the second reply 62a may contain information as follows. The first automation device 11 comprises a main automation device, and therefore the second automation device 12 comprises a substitute automation device. Based on this information, the reference device 30 is able to conclude that it must use the first address 11c for a connection request to the redundant automation system 1 from a further automation component 51,52,53,54 that is connected to the field bus.

If the first automation device 11 fails, either it notifies the reference device 30 of this shortly before failure, or the reference device 30 recognizes that a connection to the first automation device 11 can no longer be established and accordingly switches the first connection path 41 over to the second connection path 42 via the second address 12c, such that the second automation device 12 can be reached.

Figure 2:
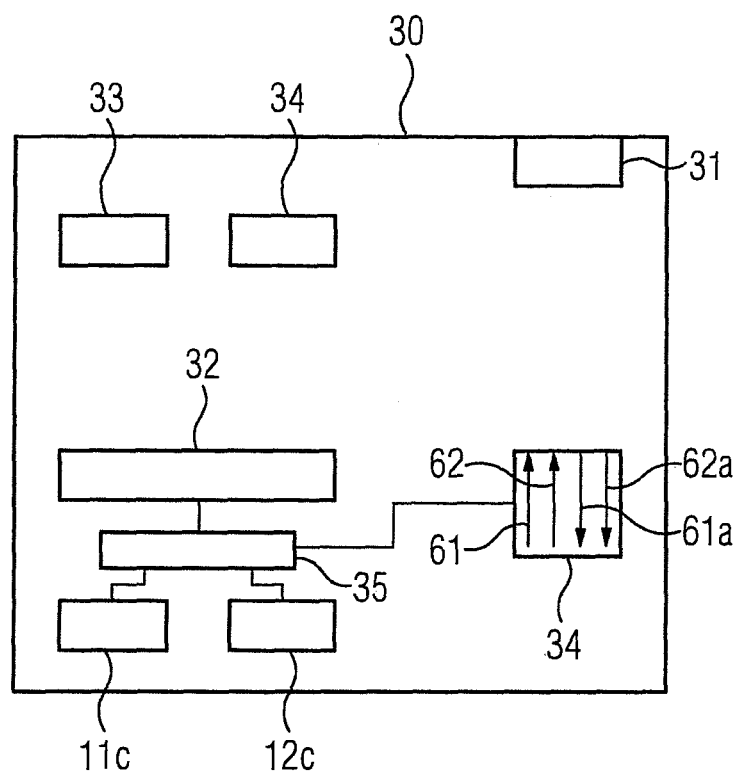
FIG. 2 shows the reference device required for the redundant automation device in a detail illustration in accordance with the invention.

FIG. 2 shows the reference device 30 in a detailed block schematic diagram. The reference device 30 has the previously cited reference data interface 31, a monitoring device 33, an initialization device 34 and its own reference address 32.

The initialization device 34 can recognize an initial connection to the field bus 20 and initiate a first notification call 61 and a second notification call 62 to the first automation device 11 and the second automation device 12 respectively, where the notification calls are normally acknowledged by a first reply 61a and a second reply 62a from the automation devices 11,12, respectively.

The initialization device 34 also interacts with a switching entity 35 for the destination address.

A further subscriber connected to the field bus 20, or any automation component 51,52,53,54 connected to the field bus 20, automatically contacts the reference address 32 of the reference device 30 as part of a connection setup to the redundant automation system 1. Based on the information relating to the currently active master in the initialization device 34, where the information comes from the first and second reply 61a,62a, the initialization device 34 can control the switching entity 35 such that either the first address 11c of the first automation device 11 or the second address 12c of the second automation device 12 is selected as a destination address during a connection setup via the reference address 32.

Figure 3:
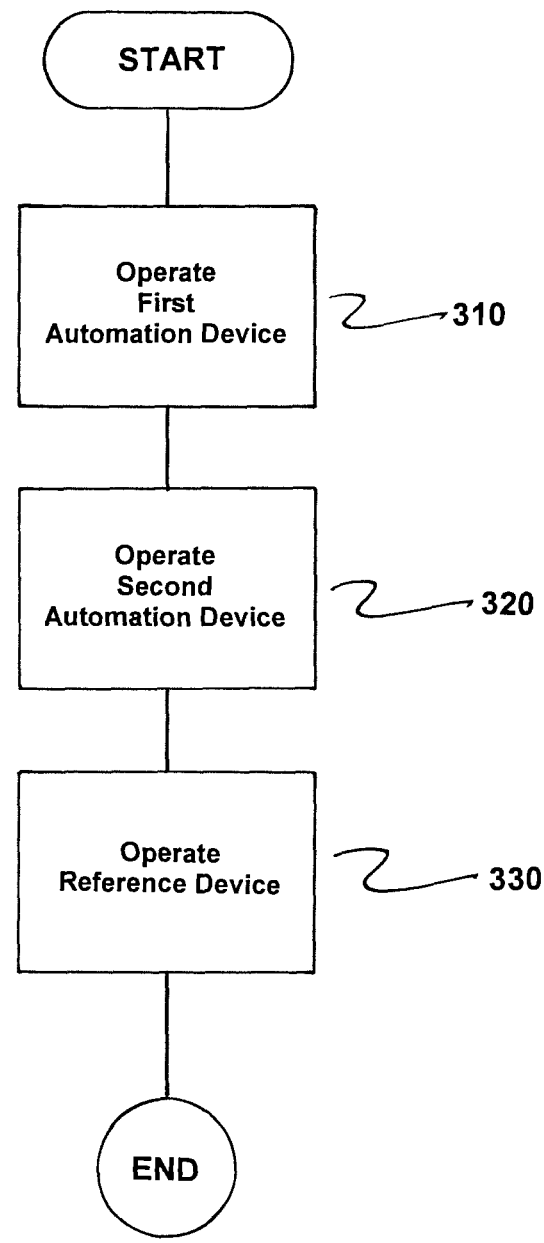
FIG. 3 is a flowchart of the method in accordance with the invention.

FIG. 3 is a flowchart of a method for operating a redundant automation system (1) for controlling a technical apparatus. The method comprises operating a first automation device (11) as a main automation device such that a first control program (11a) for controlling the technical apparatus is operated in the first automation device (11), as indicated in step 310.

Next, a second automation device (12) is operated as a substitute automation device such that a second control program (12a) for controlling the technical apparatus is operated in the second automation device (12), as indicated in step 320. Here, the first automation device (11) is synchronized with the second automation device via a link (70), the first and the second control programs (11a,12a) each functionally executes the same control tasks for the technical apparatus, and the first automation device (11) is operated on a field bus (20) via a first data interface (11b) and the second automation device (11) is operated on the field bus (20) via a second data interface (12b), and the first data interface (11b) is assigned a first address (11c) and the second data interface (12b) being assigned a second address (12c).

A reference device (30) comprising a reference address (32) is then operated such that a first connection path (41) is activated between further automation components (51,52, 53,54), which are connected to the field bus (20), and the first automation device (11), and furthermore such that upon recognition of a failure of the first automation device (11) a second connection path (42) is activated between the further automation components (51,52,53,54), which are connected to the field bus (20), and the second automation device (12), as indicated in step 330.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A redundant automation system for controlling a technical apparatus, comprising:
    a field bus;
    a first programmable logic controller including a first control program for controlling the technical apparatus, and a first data interface having an assigned first address and being connected to the field bus;
    a second programmable logic controller including a second control program for controlling the technical apparatus, and a second data interface having an assigned second address and being connected to the field bus;
    a link interconnecting the first and second programmable logic controllers, the first and second control programs of the first and second programmable logic controllers being operationally synchronized via the link such that the first and second control programs each functionally execute the same control tasks for the technical apparatus at the same time; and
    a reference device comprising a reference data interface which is connected to the field bus and to which a reference address is assigned, the reference device activating a first connection path between further automation components connected to the field bus and the first programmable logic controller, and the reference device further recognizing a failure of the first programmable logic controller and thereupon activating a second connection path between the automation components connected to the field bus and the second programmable logic controller;
    wherein the first and the second control programs are each formed to execute the same control tasks for the technical apparatus; and
    wherein a connection setup by the further automation components to one of (i) the first programmable logic controller and (ii) the second programmable logic controller is established via the further automation components contacting the reference address.

2. The redundant automation system as claimed in claim 1, wherein the reference device is formed as a separate device and is connected to the field bus separately from the first and second programmable logic controllers.

3. The redundant automation system as claimed in claim 1, wherein the reference device includes a monitoring device which is configured to monitor established connections of the further automation components to the first programmable logic controller with respect to a connection termination.

4. The redundant automation system as claimed in claim 1, wherein the reference device includes an initialization device which informs at least one of (i) the first programmable logic controller and (ii) the second programmable logic controller of an existence on the field bus of the reference device when the reference device is initially connected to the field bus; and wherein the first and second programmable logic controllers upon learning of the existence of the reference device additionally provide a notification to said reference device regarding which of the two programmable logic controllers currently controls the technical apparatus.

5. A method for operating a redundant automation system for controlling a technical apparatus, the method comprising:
    operating a first programmable logic controller as a main programmable logic controller such that a first control program for controlling the technical apparatus is operated in the first programmable logic controller;
    operating a second programmable logic controller as a substitute programmable logic controller such that a second control program for controlling the technical apparatus is operated in the second programmable logic controller, the first programmable logic controller being operationally synchronized with the second programmable logic controller via a link such that the first and the second control programs of the first and second programmable logic controllers each functionally execute the same control tasks for the technical apparatus at the same time, the first programmable logic controller being operated on a field bus via a first data interface and the second programmable logic controller being operated on the field bus via a second data interface, and the first data interface being assigned a first address and the second data interface being assigned a second address; and
    operating a reference device comprising a reference address such that a first connection path is activated between further automation components connected to the field bus and the first programmable logic controller, and furthermore such that upon recognition of a failure of the first programmable logic controller a second connection path is activated between the further automation components connected to the field bus and the second programmable logic controller;
    wherein a connection setup by the further automation components to one of (i) the first programmable logic controller and (ii) the second programmable logic controller is effected via the further automation components contacting the reference address.

6. The method as claimed in claim 5, wherein the reference device is formed as a separate device and is operated separately from the first and second programmable logic controllers on the field bus.

7. The method as claimed in claim 5, wherein a monitoring device is operated in the reference device and monitors established connections of the further automation components to the first programmable logic controller with respect to a connection termination.

8. The method as claimed in claim 5, wherein an initialization device is operated in the reference device, said initialization device detecting an initial connection of the reference device to the field bus and informing at least one of (i) the first programmable logic controller and (ii) the second programmable logic controller of existence of the reference device on the field bus; and wherein the first and second programmable logic controllers upon learning of the existence of the reference device are additionally operated to provide a notification to said reference device regarding which of the two programmable logic controllers currently controls the technical apparatus.

9. The method as claimed in claim 8, wherein the initialization device initiates a first notification call to the first programmable logic controller and a second notification call to the second programmable logic controller;
wherein the first notification call is acknowledged by the first programmable logic controller via a first reply and the second notification call is acknowledged by the second programmable logic controller via a second reply;
wherein in an event that the first reply reveals the first programmable logic controller is the main programmable logic controller, the reference device routes connection requests directed to the reference address from the further automation components connected to the field bus to the first programmable logic controller via the first address, and in an event that the second reply reveals the second programmable logic controller is the main programmable logic controller, the reference device routes connection requests directed to the reference address from the further automation components connected to the field bus to the second programmable logic controller via the second address.

* * * * *